United States Patent [19]

Yoshimura

[11] Patent Number: 4,687,426
[45] Date of Patent: Aug. 18, 1987

[54] CONSTANT VOLUME PULSATION-FREE RECIPROCATING PUMP

[75] Inventor: Hiroichi Yoshimura, Hirakata, Japan

[73] Assignee: Fuji Techno Kogyo Kabushiki Kaisha, Osaka, Japan

[21] Appl. No.: 746,828

[22] Filed: Jun. 19, 1985

[30] Foreign Application Priority Data

Jul. 31, 1984 [JP] Japan .................. 59-162590
Aug. 13, 1984 [JP] Japan .................. 59-169701
Aug. 14, 1984 [JP] Japan .................. 59-169807

[51] Int. Cl.⁴ .......................... F04B 11/00
[52] U.S. Cl. ............................... 417/539
[58] Field of Search ................ 417/539, 517

[56] References Cited

U.S. PATENT DOCUMENTS

| | | | |
|---|---|---|---|
| 1,723,874 | 8/1929 | Longe | 417/517 |
| 2,010,377 | 8/1935 | Sasson | 417/517 |
| 4,028,018 | 7/1977 | Audsley | 92/133 |
| 4,556,371 | 12/1985 | Post | 417/539 |

FOREIGN PATENT DOCUMENTS

| | | | |
|---|---|---|---|
| 1800142 | 4/1970 | Fed. Rep. of Germany | 417/539 |
| 2706685 | 8/1978 | Fed. Rep. of Germany | 417/539 |
| 350171 | 6/1931 | United Kingdom | 417/539 |

*Primary Examiner*—Carlton R. Croyle
*Assistant Examiner*—Paul F. Neils
*Attorney, Agent, or Firm*—Armstrong, Nikaido, Marmelstein & Kubovcik

[57] ABSTRACT

A reciprocating pump comprises a plurality of parallel connected cylinder plunger arrangements and is driven via a cam mechanism (10) by means of a rotary driving device. In order to insure a constant discharge, the cam mechanism (10) comprises in the case where three cylinder plunger arrangements are employed, three plate cams (14) fixed on a common shaft (13) so that they are spaced 120° apart from each other, and the displacement curve (a1;a2;a3) of each plate cam is designed such that the sum of the displacement per unit angle of rotation in the accelerating section and the displacement per corresponding unit angle of rotation in the decelerating section is equal to the displacement per unit angle of rotation in the uniform velocity section.

3 Claims, 15 Drawing Figures

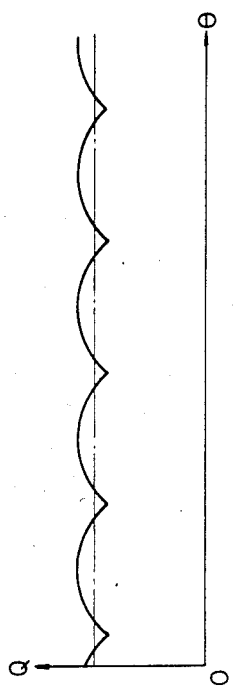
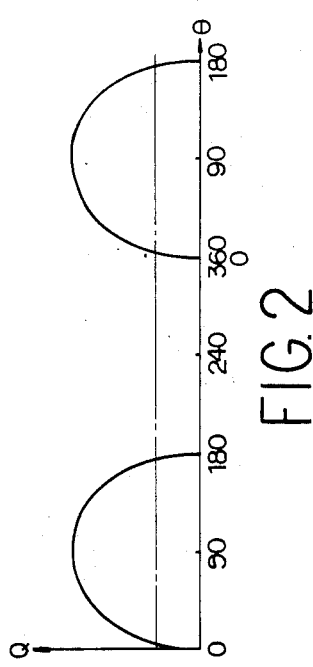
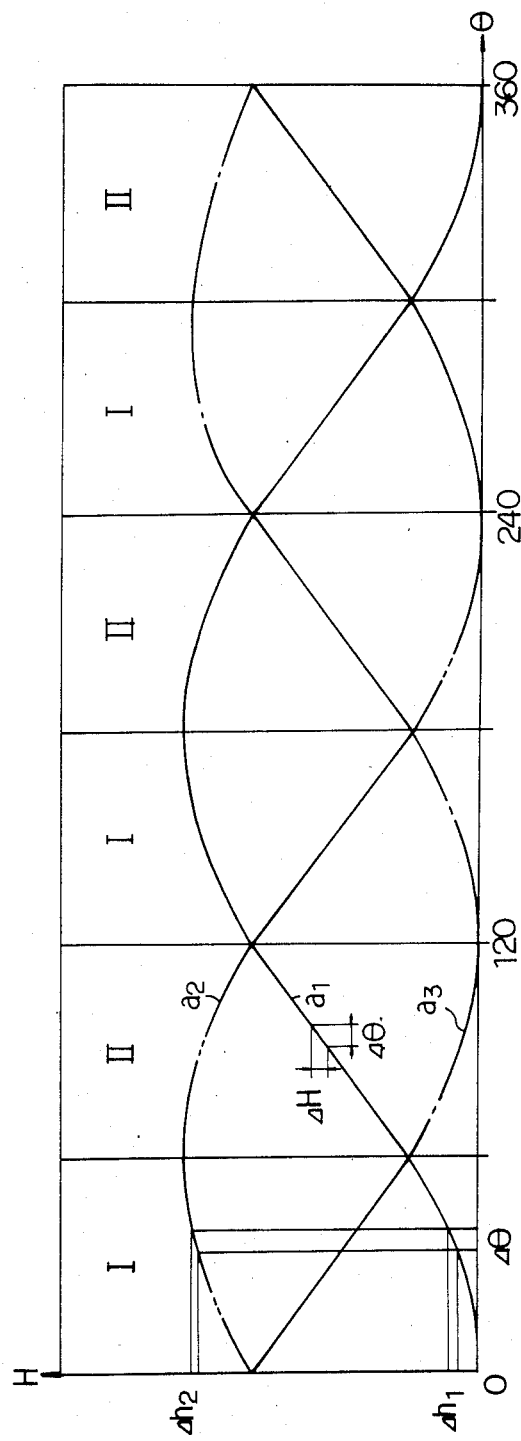

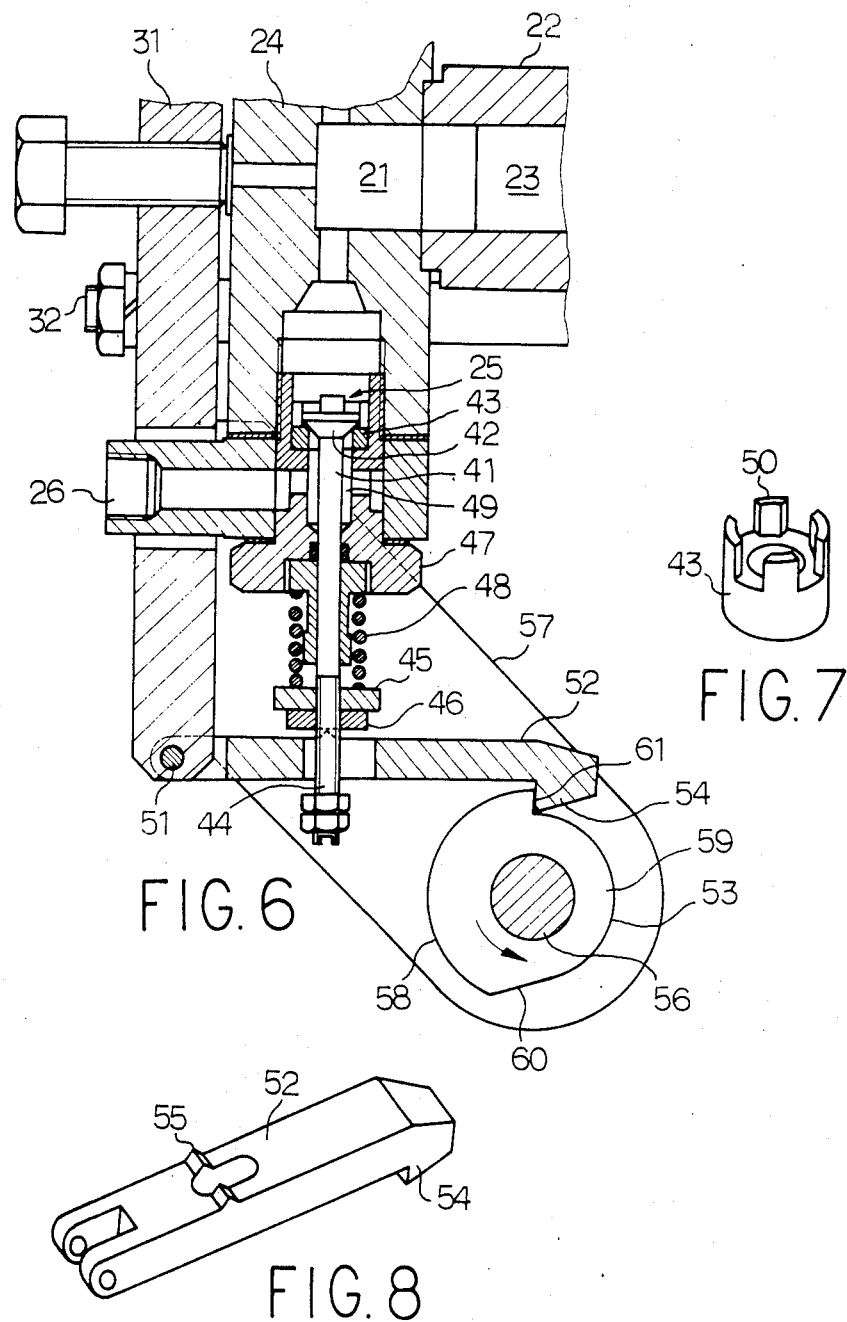

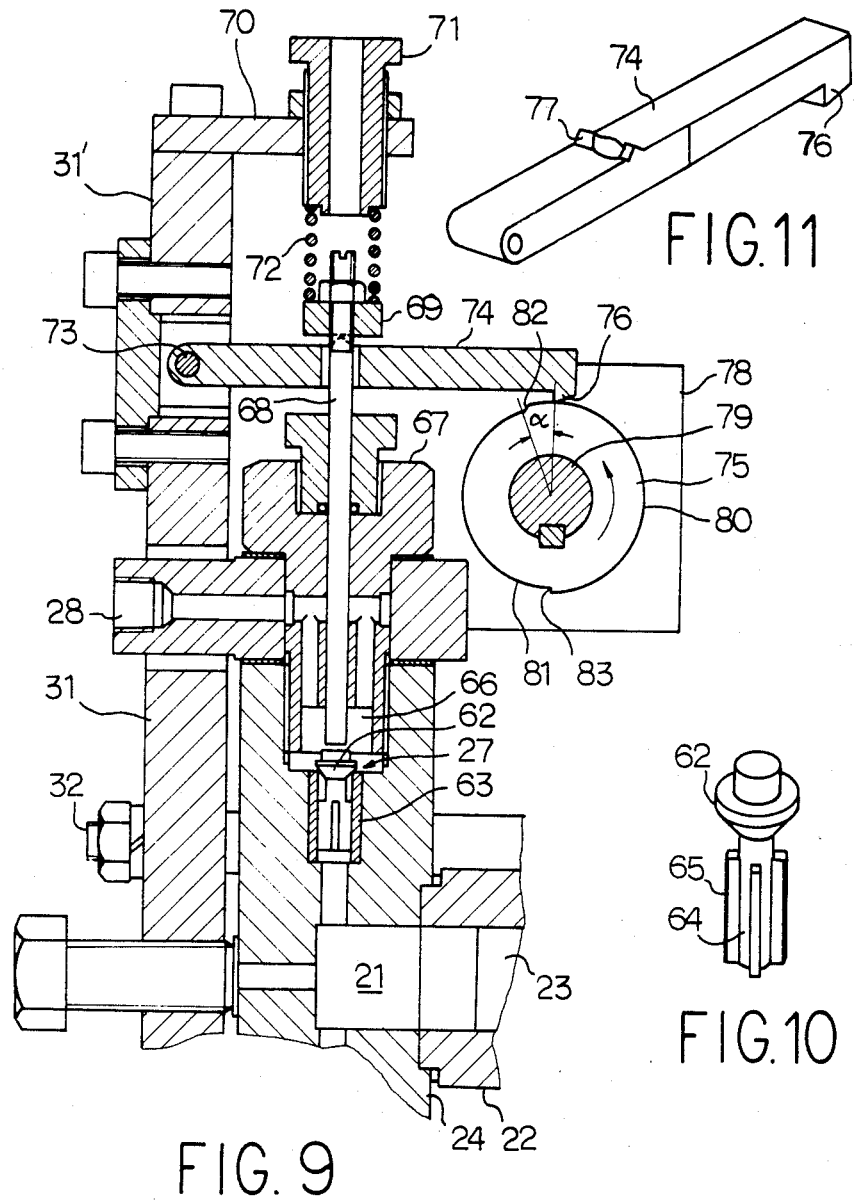

CONSTANT VOLUME PULSATION-FREE RECIPROCATING PUMP

BACKGROUND OF THE INVENTION

1. Field of the Invention

This invention relates to a cam mechanism for driving reciprocating machines and to a constant volume pulsation-free reciprocating pump utilizing said cam mechanism.

2. Description of the Prior Art

Reciprocating pumps perform pumping action consisting in the suction and delivery of liquid by the reciprocating motion of a plunger, piston or the like (hereinafter referred to collectively as a plunger) in a cylinder. Particularly, the plunger pump, as compared with others, withstands very high pressure and is superior in volumetric efficiency, so that it has been widely used in various fields. However, the delivery action of reciprocating pumps is intermittent and the delivery rate varies to a great extent, causing the so-called pulsation. If the delivery rate is not constant at any moment, as described above, various inconveniences arise. Particularly, it cannot be put to use in process plants or other facilities which require a constant volume of liquid to be fed at all times.

Generally, the reciprocating pump comprises a liquid pressing chamger, a cylinder, and a plunger axially slidably installed in the cylinder to allow its one end to come in and out of the pressing chamber. The pressing chamber communicates on one hand with a liquid suction port via a suction valve allowing the passage of only liquid flowing into the pressing chamber and on the other hand with a delivery port via a delivery valve allowing the passage of only liquid flowing out of the pressing chamber. Heretofore, ball valves and poppet valves have been used as such suction valves and delivery valves. This type of valve performs an opening and closing action, that is, it is opened by liquid pressure and closed by gravitation; thus, it is a so-called check valve allowing the passage of liquid only in one direction. There is another type in which a spring is installed in the valve mechanism to urge the valve body in one direction. In such conventional valves, however, the valve body, in closing, has to sit on the valve seat under gravitation, during which it sinks while abutting against the corners of the valve seat, making the valve closing timing inaccurate. If the closing of the valve is delayed, the liquid will flow back, leading to a variation in the delivery rate. Further, a time lag is also caused to the valve opening timing owing to surge during the opening of the valve. Even in the case of using a spring, it is necessary to use a strong spring in order to secure a stabilized valve closing timing, but because of the structural limitation requiring that such spring should be installed in the valve mechanism, it could not be expected to employ a sufficiently strong spring. Even if it can be employed, the strength of such spring, in turn, acts as a suction resistance to the suction valve or causes cavitation. For the delivery valve, it is only when the relation of pressures on both sides of the valve body during delivery stroke is that:

(liquid pressure on delivery side)+(spring pressure<(liquid pressure on pressing chamber side)

that the valve is opened, with the result that the spring pressure shares the cause of the pulsation of the delivery rate.

Further, materials for the valve body suitable for the handling of corrosive liquid include stainless steel, ceramics, titanium, and Hastelloy. Stainless steel cannot be said to be universally corrosion resistance, while ceramics, titanium and Hastelloy are too light in weight to rely on gravitation for the closing of the valve. Even if a spring is to be built in, it would be very difficult to obtain a spring designed to meet both requirements for corrosion resistance and spring constant. In the case of a valve of the conventional type using gravitation or an internal spring of limited spring pressure when handling viscous liquid, the valve opening and closing action could be slow or, at times, the valve could not move at all owing to the viscosity of liquid.

In the case of driving by using a cam mechanism, a spring is generally used for the returning of the plunger. However, as a characteristic of a spring, there is a difference in pressure between the time the spring is expanded and the time it is contracted; thus, to match with all operating conditions it is inevitable to use a considerably strong pressure, leading to the consumption of unnecessary energy and, moreover, durability has to be taken into account. It would be also possible to use a grooved cam, but in the case of a constant volume pump requiring a high degree of accuracy, the gap between the cam groove and the cam follower becomes a problem, causing difficulty to the production and assembly of the pump.

SUMMARY OF THE INVENTION

An object of this invention is to provide a reciprocating pump which is free from pulsation in the delivery rate and capable of feeding liquid always at a constant rate.

This invention is also intended to provide a cam mechanism which can be used in such a reciprocating machine as a reciprocating pump.

Another object of this invention is to provide a valve driving device for reciprocating pumps which is capable of positively opening and closing a valve at required times accurately corresponding to the stroke of the plunger and which eliminates the aforesaid disadvantages of the prior art.

A further object of this invention is to provide a plunger restoring device for reciprocating pumps which is simple in construction and which is capable of smoothly and positively imparting a restoring force to the plunger under any operating conditions.

A cam mechanism according to this invention comprises three plate cams fixed on a common shaft so that they are spaced 120° apart from each other. Each plate cam has a contour such that its displacement diagram has an ascending region in which displacement increases as the angle of rotation increases and a descending region in which displacement decreases as the angle of rotation increases. At least either the ascending region or the descending region includes an accelerating section in which displacement acceleratingly changes, a uniform velocity section in which displacement linearly changes, and a decelerating section in which displacement deceleratingly changes. The sum of the displacement per unit angle of rotation in the accelerating section and the displacement per corresponding unit angle of rotation in the decelerating section is equal to the displacement per unit angle of rotation in the uniform velocity section.

A reciprocating pump utilizing a cam mechanism according to this invention comprises three plunger pumps whose delivery ports are connected to a common delivery pipe, and the cam mechanism interposed between a driving device and the plunger pumps.

Each plunger pump comprises liquid suction and delivery ports, a cylinder having a pressing chamber communicating with said two ports, a plunger axially slidably installed in the cylinder to allow its one end to come in and out of the pressing chamber, and a cam follower rotatably supported on the other end of the plunger.

The three cam followers respectively abut against the three plate cams of the cam mechanism. The cam mechanism is arranged as described above. Thus, at least either the ascending region or the descending region corresponding to the delivery stroke of the plunger includes an accelerating section in which displacement acceleratingly changes, a uniform velocity section in which displacement linearly changes, and a decelerating section in which displacement deceleratingly changes. The sum of the displacement per unit angle of rotation in the accelerating section and the displacement per corresponding unit angle of rotation in the decelerating section is equal to the displacement per unit angle of rotation in the uniform velocity section.

In the cam mechanism, if the displacement diagrams of the three plate cams are combined, the displacement per unit angle of rotation is constant irrespective of angle of rotation and hence of time, so far as at least either the ascending region or the descending region which corresponds thereto is concerned. Therefore, in a reciprocating pump utilizing such cam mechanism, the combined delivery rate by the three plungers is constant irrespective of time.

If a cam mechanism according to this invention is utilized in a driving system for three reciprocating machines in this manner, during at least the advancing stroke or the retracting stroke of the reciprocating machine, the combined stroke per unit angle of rotation of the cam shaft or per unit time can be maintained constant at all times.

In reciprocating pumps utilizing such cam mechanism, the combined delivery rate of three plunger pumps can be maintained constant at all times.

A driving device for reciprocating pumps according to this invention is characterized by comprising a spring urging a suction valve in the valve closing direction, a cam operatively associated with the driving device of the plunger to open the suction valve against the pressing force of said spring during the time interval from the initial end to the terminal end of suction stroke of the plunger, and a cam operatively associated with the driving device of the plunger to cancel the pressing force of the spring acting on the delivery valve during the time interval from a little short of the delivery stroke of the plunger to the terminal end of the delivery stroke.

At the initial end of the suction stroke, the suction valve driving cam forcibly opens the suction valve against the pressing force of the spring, while the delivery valve driving cam effects forced closing of the delivery valve by the spring. At the terminal end of the suction stroke, the suction valve driving cam forces the suction valve to be closed by the pressing force of the spring. The delivery valve driving device cancels the pressing force of the spring acting on the delivery valve at the terminal end of the suction stroke, that is, a little short of the initial end of the delivery stroke. Thus, the suction stroke begins and as soon as the pressures before and behind the delivery valve are balanced by each other, the liquid in the pressing chamber flows out toward the delivery port while overcoming a slight resistance consisting of only the weight of the delivery valve. This situation continues until the terminal end of the delivery stroke, that is, the initial end of the suction stroke is reached.

According to this invention, the respective timings of the opening and closing of the suction and delivery valves can be caused to coincide with desired points of time on the plunger stroke. Such effect is particularly useful for a reciprocating pump which feeds viscous liquid.

A plunger restoring device for reciprocating pumps according to this invention comprises fluid chambers for receiving fluid of predetermined pressure respectively installed at a plurality of plunger pumps, all the fluid chambers communicating with each other.

Fluid being forced out of the fluid chambers of some plunger pumps included in those of the plurality of plunger pump which are on their delivery stroke flows distributively into the respective fluid chambers of the remaining plunger pumps which are on their suction stroke, thereby returning the corresponding plungers.

According to this invention, when a plunger is advancing, the fluid being forced out of the corresponding chamber flows distributively into the chambers corresponding to other plungers which are retracting, thereby returning the corresponding plungers. The total amount of fluid in all chambers and in the pipeline allowing them to communicate with each other is substantially constant at all times, enabling the return movement of the plunger to be effected smoothly. As for the fluid pressure, the lowest pressure required to return the plunger is sufficient and since it is constant at all times, there is no energy loss involved as there is in the case of using a spring. Further, the surface pressure which acts on the cam follower during the return movement of the plunger is constant at all times, so that localized wear of the cam can be prevented. Thus, the present mechanism is rational.

BRIEF DESCRIPTION OF THE DRAWINGS

FIG. 1 is a cam displacement diagram of a cam mechanism according to this invention, the vertical axis indicating the displacement of the follower and the horizontal axis and the angle of rotation of the cam shaft;

FIG. 2 is a delivery diagram of a conventional single acting reciprocating pump, the vertical axis indicating the delivery rate and the horizontal axis the angle of rotation of the cam shaft;

FIG. 3 is a delivery diagram, similar to FIG. 2, of a conventional single acting triple reciprocating pump;

FIG. 6 is an enlarged view of portion of the reciprocating pump of FIG. 5 including a suction valve;

FIG. 7 is an enlarged perspective view of a valve seat shown in FIG. 6;

FIG. 8 is an enlarged perspective view of a lever shown in FIG. 6;

FIG. 9 is an enlarged view of a portion of the reciprocating pump of FIG. 5 including a delivery valve;

FIG. 10 is an enlarged perspective view of a valve head shown in FIG. 9;

FIG. 11 is an enlarged perspective view of a lever shown in FIG. 9;

DESCRIPTION OF THE PREFERRED EMBODIMENTS

Figure 4:
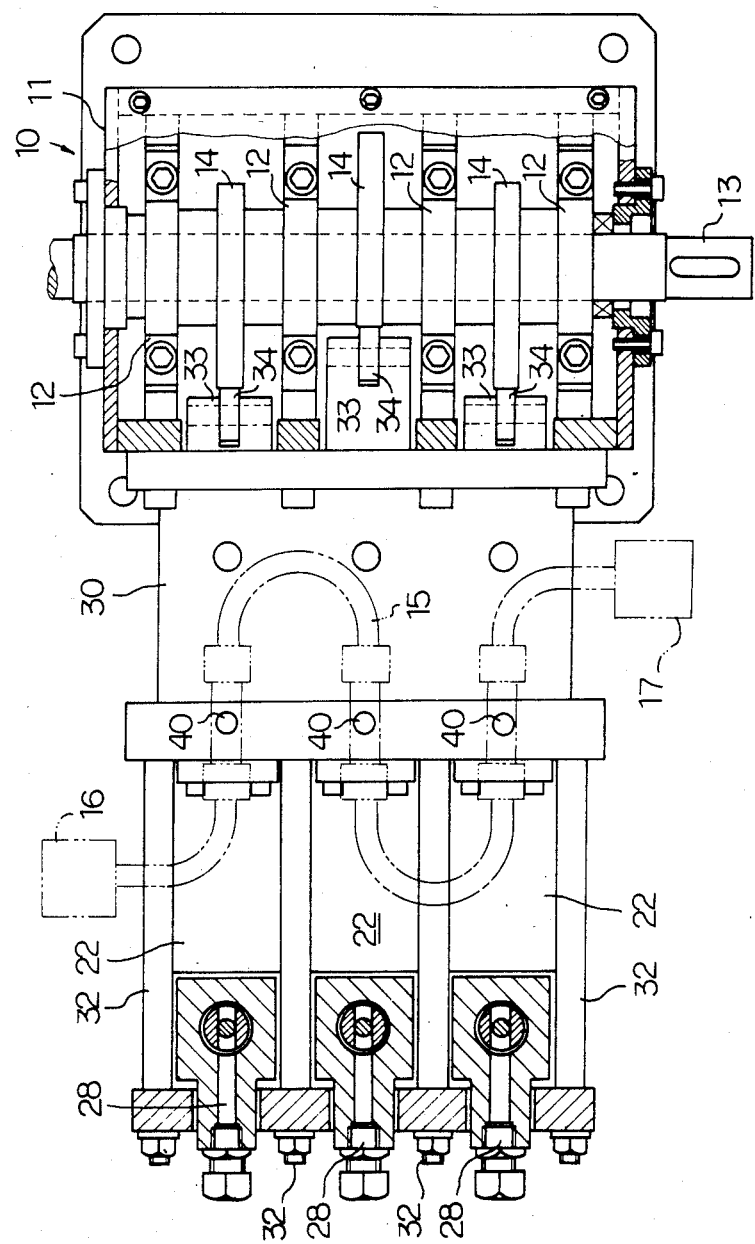
FIG. 4 is a plan view of a single acting triple reciprocating pump according to an embodiment of this invention.

First, the cam mechanism will be described.

FIG. 1 is a displacement diagram in which the vertical axis represents the displacement H of a cam follower and the horizontal axis the angle $\theta$ of rotation of a cam shaft ($\theta = \omega t$). For a better understanding of respective velocities, they are indicated by solid, dash-dot, and dash-double-dot lines. Plate cams are contoured so that cam followers describe such displacement curves.

The displacement curves a1, a2 and a3 of plate cams each have a descending region in which displacement increases as angle of rotation increases (to speak of the displacement curve a1, the region $\theta = 0°-180°$), and a decending region in which displacement decreases as angle of rotation increases (in the same curve, the region $\theta = 0°-360°$). The ascending region includes an accelerating section in which displacement acceleratingly increases (to speak of the displacement curve a1, the section $\theta = 0°-60°$), a uniform velocity section in which displacement linearly changes (in the same curve, the section $\theta = 60°-120°$), and a decelerating section in which displacement deceleratingly changes (in the same curve, the section $\theta = 120°-360°$). In the illustrated example, the ascending and decending regions are axially symmetrical. As can be seen from the figure, the displacement curves a1-a3 are of the same shape, only differing in phase by 120° from each other, the manner of intersection being of two kinds alternating every 60° (indicated by I and II in the figure).

The engineering design is such that the sum of displacement $\Delta h1$ per unit angle of rotation $\Delta \theta$ in the accelerating section and displacement h2 per unit angle of rotation $\Delta \theta$ in the decelerating section is equal to displacement $\Delta H$ per unit angle of rotation $\Delta \theta$ in the uniform velocity section. That is, either the accelerating section or the decelerating section or both sections are corrected so that the relation $\Delta h1 + \Delta h2 = \Delta H$ holds true at any position in the region I. Thereby, in this case, so far as the ascending region is concerned, displacement per unit angle of rotation, as considered from the entire cam mechanism, is constant at all times.

In addition, such design can be applied only to either the ascending region or the decending region of the displacement diagram, and in the case of axially symmetrical cams as in the illustrated example, when the cams are reversely rotated, there is obtained a cam mechanism which performs the same function. For example, if they are utilized in a reciprocating pump to be later described, either the ascending region or the decending region corresponds to the delivery stroke of a pump, while the other corresponds to the suction stroke of another pump. Thus, in that case, by applying the aforesaid design to that one of the ascending and decending regions which corresponds to the delivery stroke of a pump, it is possible to attain a constant pulsation-free delivery rate.

An embodiment of a reciprocating pump so designed will now be described. In the prior art, when a reciprocating pump is operated by a crank mechanism, since the delivery rate is not proportional to the angular velocity of the crank shaft, there is produced pulsation. In the case of a single acting reciprocating pump, the situation is as shown in FIG. 2 wherein the crank angle $\theta$ is plotted on the horizontal axis and the delivery rate Q on the horizontal axis. The delivery rate gradually increases from $\theta = 0°$ until $\theta = 90°$, where the delivery rate is at a maximum, and then it gradually decreases, with no delivery taking place on the return stroke of the plunger from $\theta = 180°$ until $\theta = 360°$, at which delivery starts again. The average delivery rate during the advance and return strokes is as indicated by a dash dot line. In the case of the so-called single acting triple type having three plungers spaced a crank angle of 120° apart from each other, the situation is as shown in FIG. 3.

Figure 5:
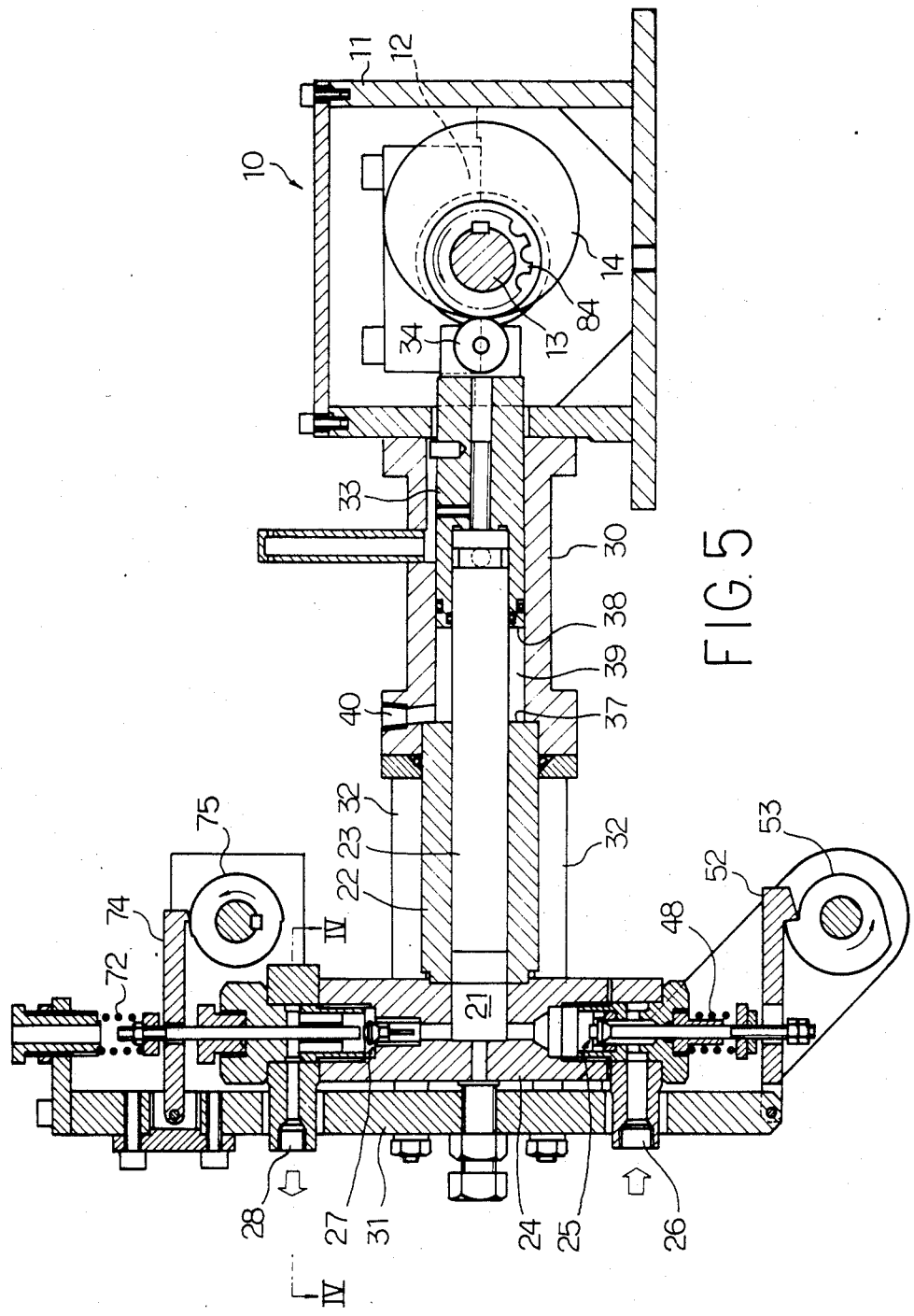
FIG. 5 is a sectional view of the reciprocating pump of FIG. 4 taken along the axis of a certain plunger pump.

In FIGS. 4 and 5, a reciprocating pump comprises three plunger pumps driven by a cam mechanism 10.

The cam mechanism 10 includes a cam shaft 13 rotatably supported in bearings 12 housed in a cam box 11, and three axially spaced plate cams 14 fixed on the cam shaft so that the angle of attachment differs successively by 120°.

Each plunger pump comprises a liquid pressing chamber 21, a cylinder 22, and a plunger 23 axially slidably installed in the cylinder 22 to allow its one end to come in and out of the pressing chamber 21. The pressing chamber 21 is formed in a head block 24 positioned at the end of the cylinder 22 and communicates on the one hand with a liquid suction port 26 through a suction valve 25 which allows passage of only fluid flowing into the pressing chamber 21 and on the other hand with a delivery port 28 through a delivery valve 27 which allows passage of only fluid flowing out of the pressing chamber 21. The delivery ports 28 lead to a common conduit or delivery pipe (not shown).

The cylinder 22 is attached to a cylinder case 30 fixed to the cam box 11. That is, the cylinder 22 and head block 24 are clamped by bolts 32 between the cylinder case 30 and a locking plate 31. The other end of the plunger 23 is coaxially integrally connected to a guide piston 33 axially slidably extending in the cylinder case 30. Rotatably supported at the end of the guide piston 33 is a cam follower 34.

In the cylinder case 30, an annular chamber 39 is defined around the plunger 23 by the end surface 37 of the cylinder 22 and the end surface 38 of the guide piston 33. The chamber 39 communicates with a hole 40 formed in the cylinder case 30. The hole 40 is connected through a pipeline to a pressure fluid source such as an accumulator or a refill making use of a spring piston. Thus, the chamber 39 is always full of pressurized fluid, producing a returning force tending to move the guide piston 33 and plunger 23 to the right as viewed in the figure. Thus, the cam follower 34 is always in contact with the cam 14.

Such returning force may be imparted by a spring, as well-known in the art. Further, in the case of a multiple pump using a plurality of plunger pumps, as in this embodiment, the same function can be attained also by an arrangement wherein all the chamber communicate with each other through a pipeline, with one end of the pipeline being connected to said pressure fluid source and the other end being closed. In this case, it is possible to use an oil pump as the pressure fluid source and install a relief valve at the other end of the pipeline. Further, as will be later described, if it is guaranteed that at any angle of rotation of the cam shaft, the displacement of the plunger on the forward stroke is equal to the displacement of the plunger on the return stroke, then the opposite ends of the pipeline establishing the communication between the chambers may be closed.

The reciprocating pump of the aforesaid arrangement operates as follows.

When a driving device (not shown) is started to rotate the cam shaft 13, the three cam followers 34 move to describe displacement curves (FIG. 1) which differ successively by 120°. This means that the three plungers 23 are reciprocated correspondingly to the same displacement curves. When a plunger 23 is on the forward stroke to the left as viewed in the figure, i.e., on the delivery stroke, back flow of liquid into the suction port 26 is prevented by a check valve 25, so that the liquid in the pressing chamber is pressed and is passed through a check valve 27 and delivered through the delivery port 28 into the common delivery pipe. It is delivered from the plunger 23 into the common delivery pipe. When the plunger 23 is on the return stroke to the right as viewed in the figure, liquid is sucked from the suction port 26 throught the check valve 25 into the pressing chamber 21. At this time, the check valve 27 prevents back flow of liquid tending to flow from the delivery port 28 toward the pressing chamber 21.

The relation between the cam mechanism 10 and the movement of the plunger pump will now be described in more detail. FIG. 5 corresponds to a state in which the angle of rotation $\theta$ in the displacement diagarm of FIG. 1 is zero. When the cam shaft 13 is rotated from this state in the direction of arrow, a first plunger, as indicated by the displacement curve a1, is acceleratingly moved to the left as viewed in FIG. 5 during the first 60° and then during the next 60° it is moved in the same direction at a constant velocity and further, during the next 60°, it is deceleratingly moved in the same direction to reach the end of the stroke. Second and third plungers will perform the aforesaid movement as they are delayed successively by 120°.

With attention paid to the first 60° duration I, it will be seen that when the first plunger is on the accelerating forward stroke, the second plunger is on the uniform velocity stroke as indicated by the displacement curve a2 and the third plunger, as indicated by the displacement curve a3, is on the decelerating return stroke. In the next 60° duration II, the first plunger enters the uniform velocity forward stroke, while the second plunger is on the decelerating return stroke and the third plunger on the accelerating return stroke. Thus, when only the forward (delivery) stroke is considered, it is seen that the uniform velocity stroke of one plunger and the combined return stroke of the remaining two plungers alternate every 60°.

In the 60° interval shown at II in FIG. 1, only the plunger corresponding to the displacement curve a1 is on the delivery stroke, the delivery rate being expressed as $\Delta Q : \Delta \theta$. In the other 60° interval indicated by I, the combined delivery by the other two plungers is effected, the delivery rate being expressed as $(\Delta q1 + \Delta q2) : \Delta \theta$. As has been described with reference to the cam mechanism, the contour of each plate cam is such that the sum of displacement $\Delta h2$ per unit angle of rotation in the accelerating section of the displacement diagram and displacement $\Delta h2$ per corresponding unit angle of rotation in the decelerating section is equal to displacement $\Delta H$ per unit angle of rotation in the uniform velocity section. Thus, the relation $\Delta Q = \Delta q1 + \Delta q2$ holds, and the delivery rate of the reciprocating pump is always constant.

The plunger returning device for reciprocating pumps will now be described. In the reciprocating pump described with reference to FIGS. 4 and 5, if each plate cam 14 is so contoured that the ascending and decending regions of the displacement diagram are axially symmetrical, then the amount of travel of one plunger which is on the uniform velocity stroke is equal to the sum of the amounts of travel of the remaining two plungers which are on the combined return stroke and the sum of the amounts of travel of two plungers which are on the combined forward stroke is equal to the amount of travel of the remaining one plunger which is on the uniform velocity stroke. Thus, in this case, since the fluid for returning the plungers only moves to and fro between the three chambers 39 with its total amount remaining unchanged, nor increased or decreased theoretically, the opposite ends of the pipeline 15 may be closed. In practice, however, in consideration of leakage or the like a pump of minimum capacity may be provided to compensate for such loss of fluid. As the pressurized fluid source, in addition to a pump it is possible to use an accumulator or a refill utilizing a spring piston. In the embodiment shown in FIG. 4, the three chambers 39 corresponding to the three plungers 23 communicate with each other through the pipeline 15 connected to holes 40. One end of the pipeline 15 is connected to a pressure source 16 such as an oil pump or accumulator, and the other end of the pipeline 15 communicates with a relief valve 17 (not necessary where the pressure source is an accumulator). Thus, the chambers 39 are always full of pressurized fluid. This pressurized fluid acts on the end surface 38 of the guide piston 33, producing a returning force which tends to move the guide piston 33 and plunger 23 to the right as viewed in the figure. The area of the end surface 38 and the pressure of the pressurized fluid may be so determined as to impart the irreducible minimum of returning force for return stroke to the plunger 23.

In addition, it has been common practice to use a spring for returning the plunger, but there is, as a characteristic of a spring, a difference in pressure when it is extended and contracted, making it unavoidable to use a considerably strong spring in order to match will all operating conditions, resulting in the consumption of unnecessary energy and, moreover, durability must be taken into consideration. Further, a grooved cam could be used, but in an arrangement requiring high accuracy in operation as in a constant volume pump which this invention is intended to provide, the gap between the cam groove and the follower becomes a problem, involving difficulties in manufacture and assembly.

The use of the double acting type utilizing fluid not only eliminates the disadvantages inherent in the prior type but also provides the following advantages:

Liquid which, when a certain plunger is on the forward stroke, is forced out of the corresponding chamber distributively flows into the other two chambers to return the corresponding plungers. Thus, the total amount of liquid in the three chambers and in the pipeline connecting them together is always constant, smoothly effecting the return movement of the plunger;

As for the pressure of liquid, the irreducible minimum required for returning the plunger is sufficient and since it is always constant, there is no loss of energy involved as there is in the case of a spring. Further, since the surface pressure acting on the cam follower during the return movement of the plunger is always constant, localized wear of the cam can be avoided. Thus, the mechanism is rational;

By operating the relief valve depending on various operating conditions (including high speed operation, low speed operation, and the handling of highly viscous liquid), any fluid pressure necessary for optimum forward movement can be quickly and easily imparted;

Since a fluid pressure corresponding to the delivery pressure of liquid exerted by the plunger can be imparted by operating the fluid pressure, leakage of liquid from the cylinder can be reduced. For example, if a pressure which is half the delivery pressure of liquid is imparted to the liquid in the chamber, leakage can be reduced to less than half the value which is involved when the liquid is exposed to the atmosphere. Further, in this case, if the plunger is lubricated by using a suitable lubricating oil as the liquid for returning the plunger, this will contribute much to improving the durability of the constant volume pump;

It is, of course, possible to provide an atmospheric pressure zone between the plunger and the returning piston to completely isolate the transfer liquid in the pressing chamber from the lubricating oil in the chamber, so as to prevent leakage flows from mixing together;

In the case of handling liquid at high temperature, a cooling effect can be expected by circulating the plunger returning liquid. In addition to the cooling of the plunger, the transfer of heat from the plunger and cylinder to other components (cylinder case, guide pin, cam mechanism, etc.) can be prevented to thereby protect these components.

The valve driving device will now be described. As shown in FIG. 6, the suction valve 25 positioned between the liquid suction port 26 and the pressing chamber 21 comprises a valve head 42 formed conically on one end of a valve stem 41, and an annular valve seat 43 cooperating therewith. The valve stem 41 extends through a hole in the valve seat 43 and has a threaded portion 44 on the other end thereof. The threaded portion 44 has threadedly mounted thereon a spring seat 45 and a cam abutting nut 46. The valve stem 41 is urged by a spring 48 disposed between the spring seat 45 and a locking joint 47 to cause the valve head 42 to abut against the valve seat 43. The locking joint 47 is threadedly inserted in the head block 24 and provides a communication passage 49 between the suction valve 25 and the suction port 26. In addition, as can be seen from FIG. 7, the valve seat 43 has a plurality of guides 50 for radially guiding the valve head 42.

A lever 52 pivotally connected at one end to the locking plate 31 by a pin 51 is formed at the other end with a pawl 54 cooperating with a suction valve driving cam 53 and at its intermediate portion with a projection 55 cooperating with a cam abutting nut 46 (FIG. 8). A support shaft 56 carrying the cam 53 is rotatably supported between a pair of brackets 57 and is operatively connected to the cam shaft 13 of the cam mechanism by a transmission device (not shown) comprising sprockets and a chain. That is, when the cam shaft 13 rotated one revolution, the support shaft 56 is also rotated one revolution.

The contour of the suction valve driving cam 53 comprises a large diameter portion 58 extending along substantially half the circumference of the cam 53 corresponding to the suction stroke of the plunger 23 and a small diameter portion 59 extending along the remaining substantially half the circumference of the cam 53 corresponding to the delivery stroke of the plunger 23. The large diameter portion 58 includes a slope portion 60 smoothly continuous with the small diameter portion 59 and corresponding to the terminal end of the suction stroke, i.e., the initial end of the delivery stroke. Further, in the portion corresponding to the terminal end of the suction stroke, i.e., the initial end of the delivery stroke, the two portions 58 and 59 are discontinuous, forming a step 61.

The delivery valve 27 positioned between the pressing chamber 21 and the liquid delivery port 28, as shown in FIG. 9, comprises a conical valve head 62 and an annular valve seat 63 cooperating therewith. As can be seen from FIG. 10, the extension 64 of the valve head 62 is provided with a plurality of radially extending guide ribs 65. The guide ribs 65 are adapted to come in slide contact with the hole of the valve seat 63 to radially guide the valve head 62. Extending through a locking joint 67 threadedly inserted in the head block 24 to provide a communication passage 66 between the delivery valve 27 and the delivery port 28 is a valve stem 68 which is coaxial with the valve head 62 and axially slidable. The valve stem 68 has a spring seat 69 threadedly attached to one end thereof. A hanger plate 70 attached to the extension 31' of the locking plate 31 has an adjusting screw 71 threadedy inserted therein. A spring 72 interposed between the adjusting screw 71 and the spring seat 69 urges the valve stem 68 downward as viewed in the figure. Thus, normally the action of this spring 72 causes the valve stem 68 to press the valve head 62 against the valve seat 63.

A lever 74 supported at one end in the extension 31' by a pin 73 is formed at the other end thereof with a pawl 76 cooperating with a delivery valve driving cam 75 and at its intermediate portion with a projection 77 abutting against the spring seat 69 (FIG. 11). A support shaft 79 carrying a cam 75 thereon is rotatably supported between a pair of brackets 78 and is operatively associated with the cam shaft 13 of the cam mechanism by a transmission device (not shown) comprising sprockets and a chain. That is, when the cam shaft 13 is rotated one revolution, the support shaft 78 is also rotated one revolution.

The contour of the delivery valve driving cam 75 comprises a large diameter portion 80 extending along substantially half the circumference of the cam 75 corresponding to the delivery stroke of the plunger 23, and a small diameter portion 81 extending along the remaining substantially half the circumference of the cam 75 corresponding to the suction stroke of the plunger 23. The large diameter portion 80 is greater than the small diameter portion 81 by an angle $\alpha$. The suitable range of $\alpha$ is determined by the rpm of the cam 75 and the delivery pressure of the pump. The initial portion 82 of the large diameter portion 80 is smoothly continuous with the small diameter portion 81. Further, in the portion corresponding to the terminal end of the delivery stroke, i.e., the initial end of the suction stroke, the two portions 80 and 81 are discontinuous, forming a step 83.

Figures 12, 13:
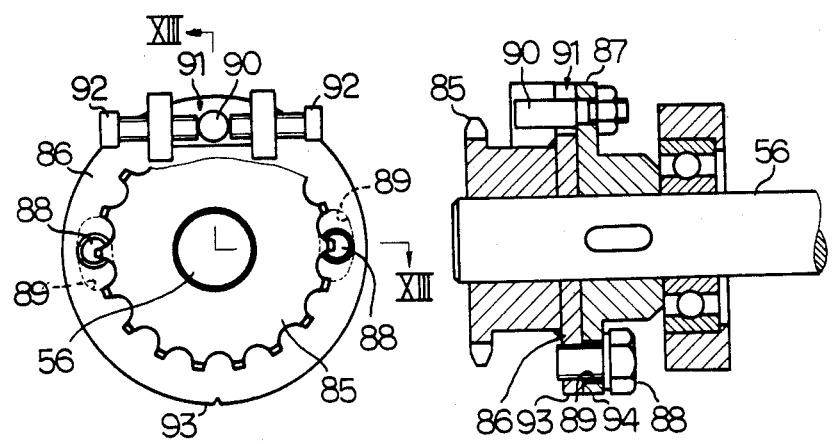
FIG. 12 is a view of a finely adjusting mechanism taken from the end of a support shaft shown in FIG. 5.
FIG. 13 is a sectional view taken along the line A—A in FIG. 12.

FIGS. 12 and 13 illustrate a mechanism for finely adjusting the timing of the opening and closing of each valve. This finely adjusting mechanism is provided separately for each of the suction and delivery valves and is used to make independent fine adjustments of the timing of the opening and closing of each valve. Since these mechanisms are of the same arrangement, the one for the suction valve 25 will be taken up for description. FIG. 12 shows the end of the support shaft 56 (FIG. 6) having the suction valve driving cam 53 attached thereto. A sprocket 85 operatively connected to a sprocket 84 on the cam shaft 13 of the cam mechanism by a chain is loosely mounted on the support shaft 56. The sprocket 85 has an adjuster plate 86 integral therewith, said adjuster plate 86 being adapted to be clamped by bolts 88 to a plate 87 keyed to the support shaft 56. Holes 89 in the plate 87 through which the bolts 88 extend are circumferentially elongated. The adjuster plate 86 has a notch 91 to clear a pin 90 fixed to the plate 87, and a pair of opposed adjusting screws 92 are threadedly inserted on both circumferential sides of the notch 91 with the pin 90 interposed therebetween. Thus, the angular position of the adjuster plate 86 with respect to the plate 87 can be changed by loosening the bolts 88 and turning the adjusting screws 92 to change their axial positions. it will be understood that this is the operation of relatively changing the angle of rotation of the support shaft 56 with respect to the cam shaft 13, or the operation of changing the timing of the opening and closing of the suction valve 25 with respect to the stroke of the plunger 23. That is, this makes it possible to simultaneously adjust the timing of the opening and closing of three cams (in the case of a triple pump). In addition, the timing of the opening and closing of the delivery valve 27 with respect to the stroke of the plunger 23 can be changed by a finely adjusting mechanism of the same arrangement. Further, if the outer peripheral surface 93 of the adjuster plate 86 is formed with a notch and if the outer peripheral surface 94 of the plate 87 is correspondingly formed with graduations of predetermined spacing, the finely adjusting operation can be facilitated.

The operation of the reciprocating pump valve driving device arranged in the manner described above will now be described with reference to FIG. 14. In addition, displacement curves a, b and c in FIG. 14 refer to the plunger driving cam 14, the suction valve driving cam 53 and the delivery valve driving cam 75, respectively.

Figure 14:
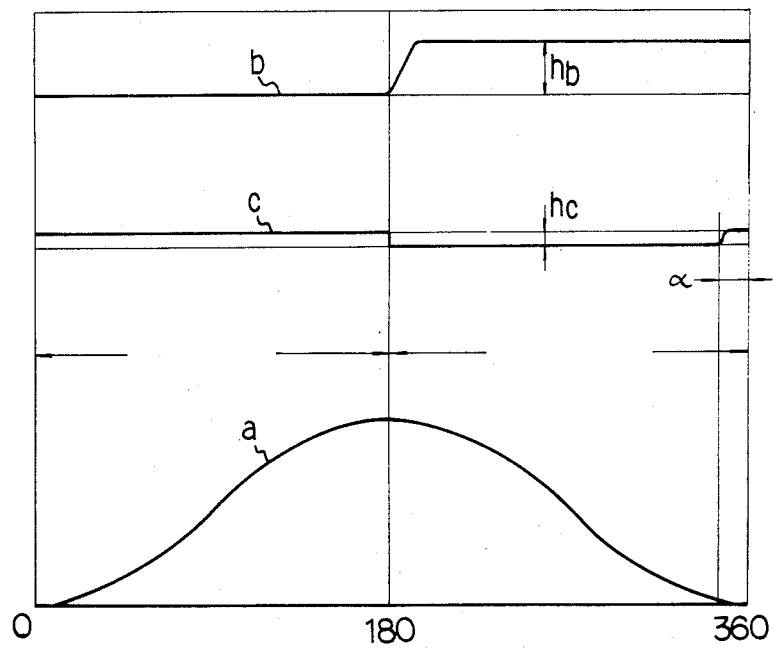
FIG. 14 is a displacement diagram of three cams used in the reciprocating pump of FIG. 5, the vertical axis indicating the angle of rotation and the horizontal axis the displacement.
Figure 15:
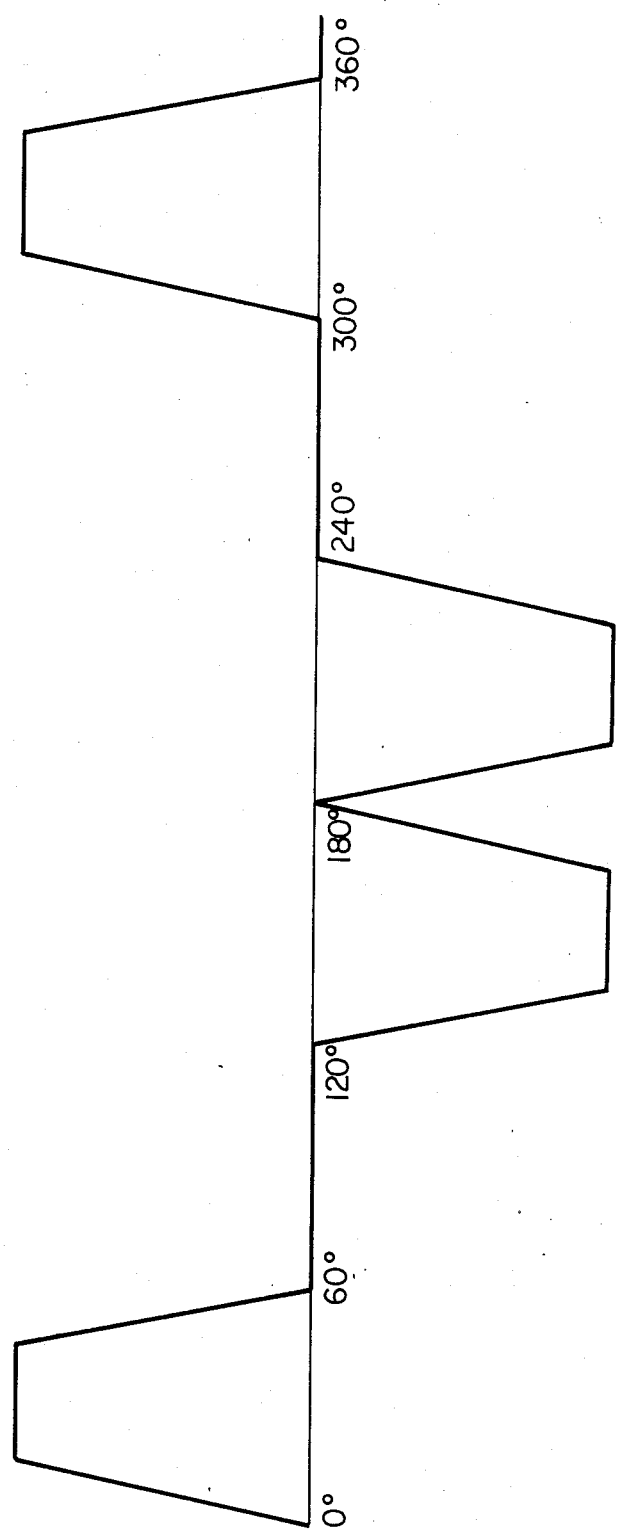
FIG. 15 is a plot showing piston acceleration as a function of cam angle $\theta$.

The states shown in FIGS. 5, 6 and 9 each correspond to the position where $\theta=0°$ in FIG. 14, that is, the suction stroke has completed and the delivery stroke is just about to start. In such state, the suction valve 25 has been closed and the delivery valve 27, though released from the pressing force of the spring 72, has been closed because of a difference between the pressures across said valve.

First, the delivery stroke which continues from this state until the cam shaft 13 is rotated through 180° will be considered. As can be seen from FIGS. 6 and 14, the suction valve driving cam 53 produces no displacement during this interval of 180°. In other words, the pawl 53 of the lever 52 continues to engage the small diameter portion 59 of the cam 53, giving no displacement to the valve stem 41. Therefore, the suction valve 25 remains closed. On the other hand, as can be seen from FIGS. 9 and 14, the delivery valve driving cam 75 maintains displacement hc during this interval of 180°. In other words, the pawl 76 of the lever 74 continues to engage the large diameter portion 80 of the cam 75. Therefore, the delivery valve 27 remains released from the pressing force of the spring 72. In addition, in the initial portion of this delivery stroke, the pressure in the pressing chamber 21 rises with the movement of the plunger 23 and as soon as the pressure on opposite sides of the valve head 62 are balanced, the liquid pushes the valve head 62 open and flows from the pressing chamber 21 to the delivery port 28. The resistance at this time is only the slight weight of the valve body 62.

When the terminal end of the delivery stroke is reached, the step portion 83 of the delivery valve driving cam 75 disengages the pawl 76 of the lever 74 from the large diameter portion 80, whereupon the pawl falls down to the small diameter portion 81. Thereby, the lever 74 decends and the valve stem 68 is moved downward as viewed in FIG. 9 by the action of the spring 72 to press the valve head 62 against the valve seat 63. Thus, the delivery valve 27 is firmly closed in an instant. Concurrently, the pawl 54 of the lever 52 is disengaged from the small diameter portion 59 of the suction valve driving cam 53 and instead starts to engage the slope portion 60. This is the start of the suction stroke ranging over the next 180°. When the suction stroke starts, the suction valve driving cam 53 causes the lever 52 to gradually raise the valve stem 41, moving the valve head 42 away from the valve seat 43 against the pressing force of the spring 48. As a result, the suction valve 25 is opened, allowing the liquid to flow from the suction port 26 into the pressing chamber 21. As shown in FIG. 14, the cam 59 maintains the pawl 54 of the lever 52 at displacement hb during the suction stroke, keeping the suction valve 25 open.

As the suction stroke approaches its terminal end, the delivery valve driving cam 75 raises the lever 74 at a position a little (the amount of said $\alpha$, expressed in terms of angle of rotation) short of the terminal end of the delivery stroke. Since the lever 74 is contacted at its projection 77 with the spring seat 69, the valve stem 68 is moved upward as viewed in the figure against the pressing force of the spring 72, so that the pressing force of the spring 72 acting on the valve head 62 is removed. At this time, downstream of the valve head 62, i.e., on the delivery port 28 side, the liquid delivered by the previous delivery stroke remains at a predetermined pressure and the liquid which is present upstream of the valve head 62, i.e., in the pressing chamber 21 is at the negative pressure produced by the suction stroke; thus, the valve head 62 remains seated on the valve seat 63 because of the difference between the pressures across the valve head 62. At the terminal end of the suction stroke, the pawl 54 of the lever 52 is disengaged from the large diameter portion 58 of the suction valve driving cam 53 by the step portion 61 and falls down onto the small diameter portion 59, bringing the lever 52 back to its FIG. 6 state. As a result, the suction valve 25 is instantly closed by the pressing force of the spring 48.

In this manner, during the delivery stroke of the plunger 23 shown in FIG. 14, the displacement curve b of the suction valve driving cam 53 remains at the displacement zero and the displacement curve c of the delivery valve driving cam 75 maintains the displacement hc. When the suction stroke is reached, the suction valve driving cam 53 maintains the displacement hc and the delivery valve driving cam 75 initially makes no displacement but at a position which is α short of the terminal end of the suction stroke it makes again the displacement hc. The timing of such cam is attained in that, as described above, the cam shaft 13 of the cam mechanism for reciprocating the plunger 23 is operatively associated with the support shafts 56 and 78 for supporting the cams 53 and 75 by a transmission devide comprising, e.g., sprockets and a chain.

If the springs 48 and 72 are disposed outside the valve mechanisms as described above, there is no limitation due to the spring storing space as there is when they are stored in the valve mechanism, so that it becomes easier to design a spring which is effective to ensure quick and positive closing of the valve. Further, since these springs 48 and 72 do not come in contact with liquid, even in the case of handling corrosive liquid it is only necessary to give consideration to corrosion resistance in connection with only the valve head and the valve seat so far as the valve mechanisms are concerned.

If the valve driving device of this invention is employed in a constant volume pump adapted to prevent pulsation of the delivery rate, as described above, it will contribute to improving the volumetric constancy of the pump by ensuring the accurate timing of the opening and closing of the suction and delivery valves.

In addition, the embodiment described herein is intended to control the opening and closing of the suction and delivery valves by cams operatively associated with the plunger driving cams. In this case, however, it is also possible to design a valve driving cam configuration such that the degree of opening of each valve is proportional to the flow rate at any position of the plunger. Further, the operative association of the timing of the opening and closing of the suction and delivery valves with the movement of the plungers can be made also by the following arrangements in addition to the aforesaid embodiment:

(a) Method based on slide valve
  i. Distributing valve based on planar reciprocating motion
  ii. Distributing valve based on rotary flat surface
  iii. Distributing valve based on cylindrical rotary surface
  iv. Distributing valve based on conical rotary surface
(b) Method of effecting electrical timing by solenoid valve
(c) Method of effecting timing indirectly by hydraulic or pneumatic pressure
(d) Method of automatically effecting timing in accordance with speed of pump by mechanical seal or microcomputer.

Having described just as a specific embodiment of the invention, the cam mechanism with three cam plates and the reciprocating pump including three cylinder-plunger arrangements associated with such cam mechanism, it is believed obvious that modification and variation of the invention is possible without departing from the spirit and scope thereof.

In particular, it is to be understood that the invention may be embodied in the form of the cam mechanism with more than three cam plates. The reciprocating pump may likewise comprise more than three cylinder-plunger arrangements.

What is claimed is:

1. A cam mechanism for a constant volume, pulsation-free reciprocating pump having three plunger pumps each comprising a bore, a piston, at least one suction port and valve and at least one delivery port and valve and being connected to a common delivery pipe, said cam comprising three plate cams affixed on a common shaft at 120° intervals to each other, said cams having an ascending region having a duration of 180° during which displacement increases as the angle of rotation of the plate cam increases and a descending region having a duration of 180° during which displacement decreases as the angle of rotation of the plate cam increases, said ascending region and descending region being divided into seven phases, the first phase being one during which the rate of acceleration gradually increases, the second phase being one during which the rate of acceleration is constant, the third phase being one during which the rate of acceleration gradually decreases to zero, the fourth phase being one during which the rate of acceleration is zero, the fifth phase being one during which the rate of acceleration gradually decreases, the sixth phase being one during which the rate of acceleration is constant, and the seventh phase being one during which the rate of acceleration gradually increases to zero, the arrangement of cam profiles being such that the sum of the displacement per unit angle of rotation of the three cams is constant.

2. A cam mechanism as set forth in claim 1, characterized in that said ascending region and said decending region are axially symmetrical.

3. A reciprocating pump comprising three plunger pumps whose delivery ports are connected to a common pipe, and a cam mechanism interposed between a driving device and the plunger pumps, each plunger pump comprising at least one liquid suction port and suction valve and at east one liquid delivery port and delivery valve, a cylinder having a pressing chamber connected to said ports, a plunger axially slidably installed in the cylinder to allow its one end to come in and out of the pressing chamber, a cam follower rotatably supported on the other end of the plunger, and means for urging the plunger to cause the cam follower to abut against the cam at all times, said cam mechanism comprising three plate cams fixed on a common shaft at 120° intervals to each other, said cams having an ascending region having a duration of 180° during which displacement increases as the angle of rotation of the plate cam increases and a descending region having a duration of 180° during which displacement decreases as the angle of rotation of the plate cam increases, said ascending region and descending region being divided into seven phases, the first phase being one during which the rate of acceleration gradually increases, the second phase being one during which the rate of acceleration is constant, the third phase being one during which the rate of acceleration gradually decreases to zero, the fourth phase being one during which the rate of acceleration is zero, the fifth phase being one during which the rate is acceleration gradually decreases, the sixth phase being one during which the rate of acceleration is constant, and the seventh being one during which the rate of acceleration gradually increases to zero, the arrangement of cam profile being such that the sum of the displacement per unit angle of rotation of the three cams is constant.

* * * * *